United States Patent [19]
Prescott et al.

[11] 3,892,381
[45] July 1, 1975

[54] FAIL-SAFE VALVE

[75] Inventors: Norman F. Prescott, Wenham; Alexander J. McKay, Lynn, both of Mass.

[73] Assignee: Atwood & Morrill Co., Salem, Mass.

[22] Filed: Oct. 23, 1973

[21] Appl. No.: 408,333

[52] U.S. Cl. .................... 251/26; 251/47; 251/58
[51] Int. Cl. .......................................... F16k 31/383
[58] Field of Search ............ 251/25, 33, 36, 26, 58, 251/47

[56] References Cited
UNITED STATES PATENTS

| | | | |
|---|---|---|---|
| 3,006,596 | 10/1961 | Nelson | 251/33 |
| 3,258,229 | 6/1966 | Larson | 251/25 X |
| 3,650,506 | 3/1972 | Bruton | 251/58 X |

*Primary Examiner*—Arnold Rosenthal
*Attorney, Agent, or Firm*—John E. Wilson; Marvin A. Naigur

[57] ABSTRACT

A valve which is actuated by the fluid medium passing through the valve.

9 Claims, 4 Drawing Figures

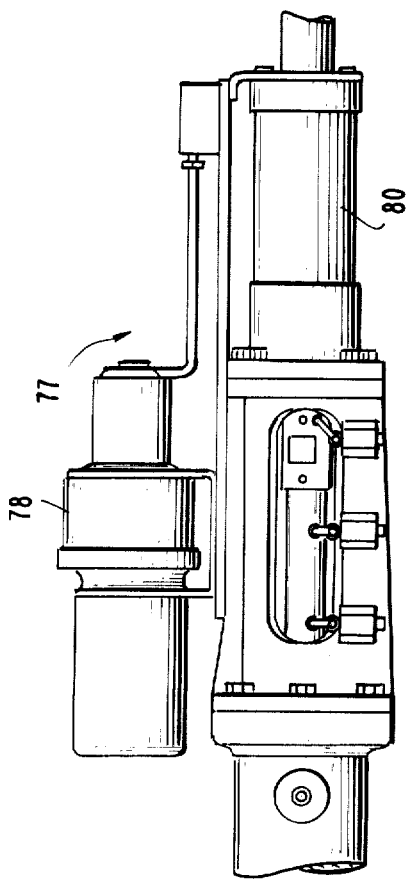
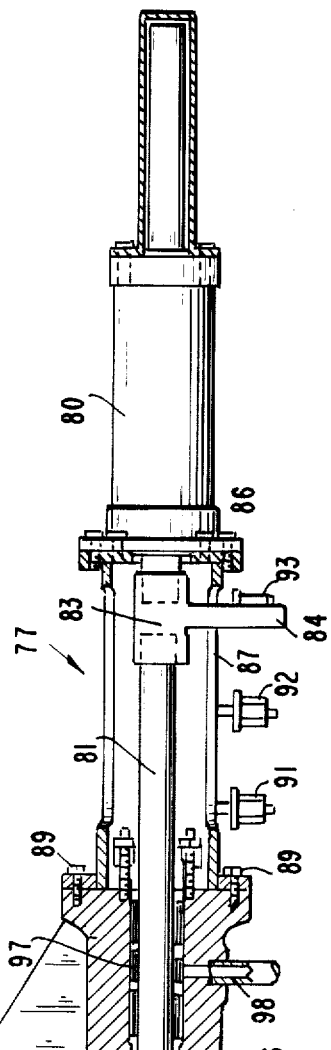
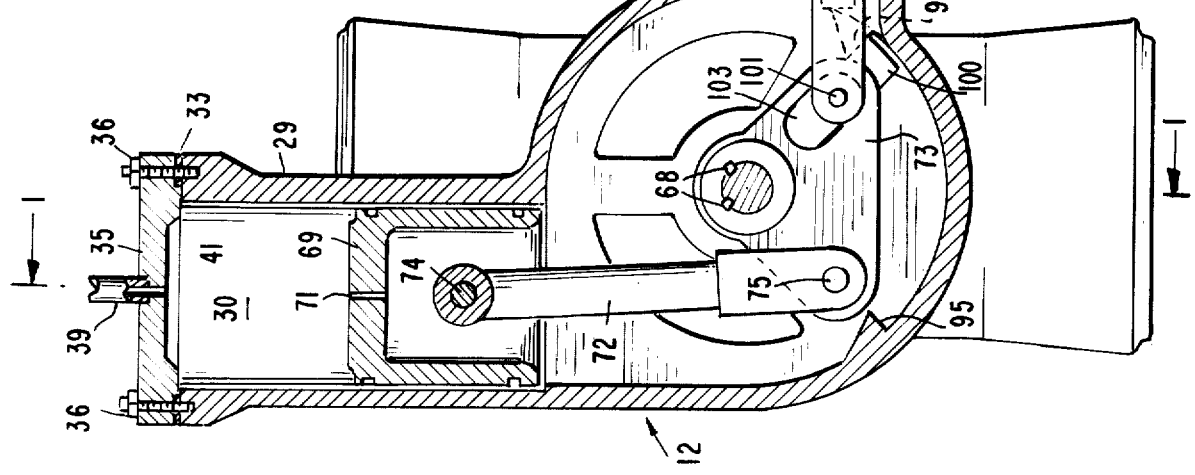
FIG. 3
FIG. 2

3,892,381

FAIL-SAFE VALVE

BACKGROUND OF THE INVENTION

In commercial operations it is essential to either open or close specific valves under abnormal conditions such as a failure in a steam generator. Valves which are actuated by a separate hydraulic or spring means can fail under normal conditions. Operation of the valve by the fluid medium passing through it assures operation of the valve.

The fluid medium passing through the valve has been utilized in earlier designs, in conjunction with a diaphragm and weight as a pressure control device as shown in U.S. Pat. No. 1,311,442. The fluid medium has also been used to actuate a valve but in a totally different embodiment, as shown in U.S. Pat. No. 2,744,719.

BRIEF SUMMARY OF THE INVENTION

In accordance with the present invention, a ball valve is located in a valve housing. A cylinder and piston assembly is located adjacent to the valve housing with the piston rod of the assembly connected to the shaft on which the ball valve is rotatably mounted. The piston rod is so connected to the shaft so as to rotate the ball valve open or closed upon actuation of the piston. A port from the opening through the ball valve supplies steam or another fluid medium under the piston tending to force the piston away from the shaft thereby rotating the shaft. An outlet at the end of the cylinder is provided with a shutoff either manually or automatically actuated. Opening of the shutoff releases the pressure of the fluid medium creating a resulting force on the piston thereby operating the valve.

A hydraulic assembly is also attached to the shaft. This serves as a dampening device or speed control by displacing fluid from one side of a hydraulic piston to the other side. The hydraulic assembly, through a pumping unit and directional valves, opens the valve and may be used for exercising and test purposes, or may close the valve.

BRIEF DESCRIPTION OF THE DRAWINGS

The above brief description as well as further objects, features, and advantages of the present invention will be more fully appreciated by referring to the following detailed description of a presently preferred but nonetheless illustrative embodiment in accordance with the present invention, when taken in connection with the accompanying drawings wherein:

FIG. 2 is a sectional view along line 2—2 of FIG. 1 looking in the direction of the arrows and showing the actuating assembly in relationship to the hydraulic assembly;

FIG. 3 is a plan view of the hydraulic assembly; and

DESCRIPTION OF THE PREFERRED EMBODIMENT

Figure 1:
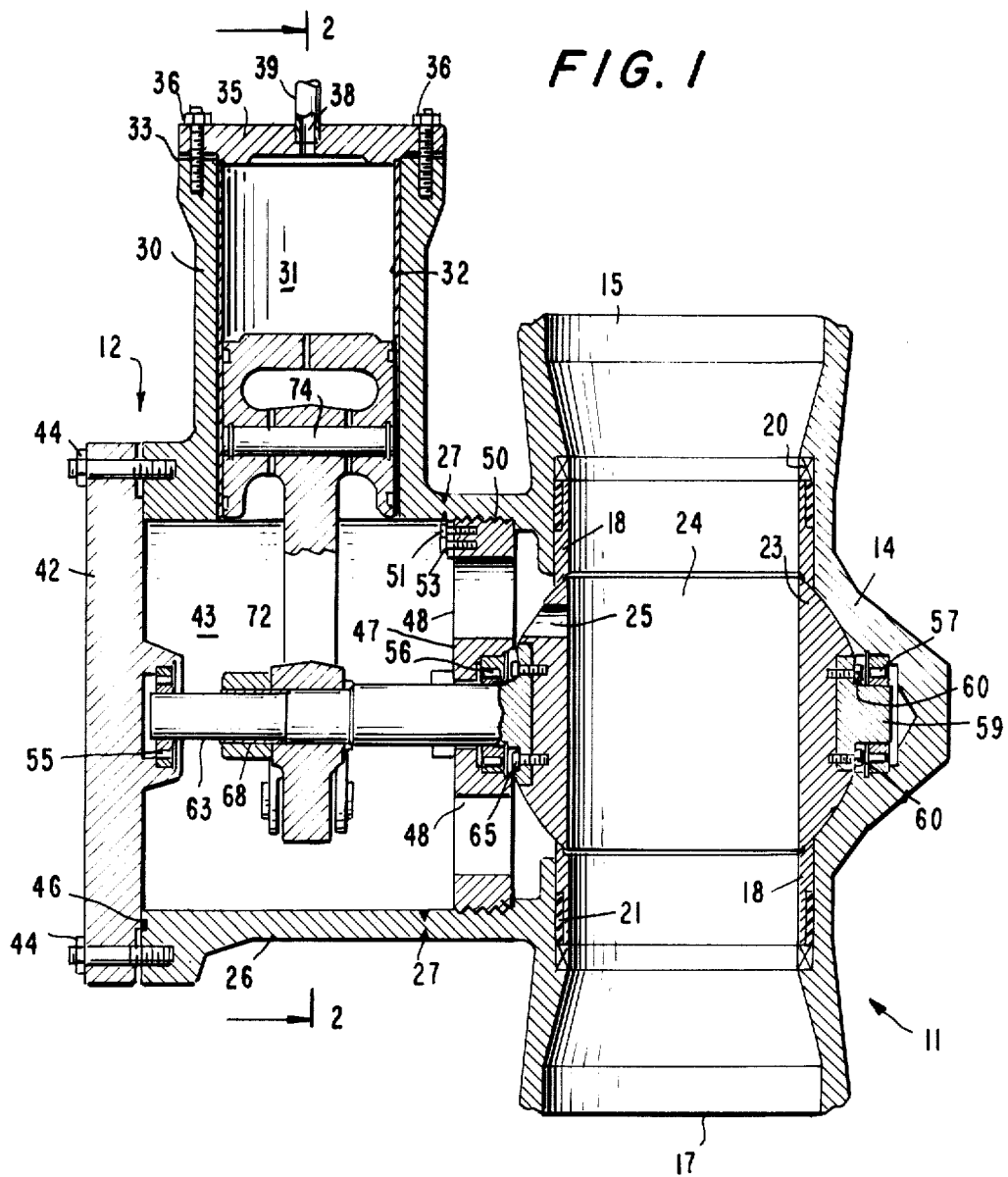
FIG. 1 is a sectional view along line 1—1 of FIG. 2 looking in the direction of the arrows and showing the valve assembly and the actuating assembly.

With reference to FIG. 1, in accordance with the present invention, a valve assembly 11 and an actuator assembly 12 are shown. The valve assembly 11 will operate with flow in either direction, but for the purpose of more easily describing the operation, the inlet and outlet have been respectively designated by the reference numerals 15 and 17. The valve assembly 11 includes a valve housing 14 in the form of a tubular body with an inlet 15 and an outlet 17. The inlet 15 and outlet 17 are axially aligned. Sleeves 18 are set into the housing 14 and are held in place by springs 20. Compressible seals 21 prevent leakage between the sleeves 18 and the valve housing 14. Rotatably mounted in the valve housing 14 is a valve ball 23 having a passageway 24 through the valve ball 23. At right angles to the passageway 24 is a conduit 25.

The actuator assembly 12 includes an actuator housing 26. The actuator housing 26 is secured to the valve housing 14 by welds 27. The narrower portion of the actuator housing 26 forms a cylinder assembly 30 with a cylinder 31 therein which is lined with a sleeve 32. The outside end 33 of the cylinder assembly 30 is enclosed by a cylinder head 35 secured to the actuator housing 26 by bolts 36. A discharge port 38 is provided in the cylinder head 35 and is connected to a discharge conduit 39. A sealing means 41 prevents leakage between the cylinder head 35 and the actuator housing 26.

A plate 42 forms an enclosure 43 which is a portion of the actuator housing 26 and is secured to the actuator housing 26 by means of bolts 44. A seal 46 prevents leakage between the plate 42 and the actuator housing 26. A support plate 47 is located within the enclosure 43 of the valve housing 14 adjacent to the actuator housing 26. The support plate 47 which has passageways 48 through it is held in place by threaded means 50 and a retaining plate 51 fastened to the support plate 47 by bolts 53.

Located in the plate 42, the support plate 47, and the valve housing 14 are bearings 55, 56, 57.

A shaft extension 59 is secured to the valve ball 23 by bolts 60 and is rotatably mounted in the bearing 57. A shaft 63, which is axially aligned with the shaft extension 59, secured to the valve ball 23 by bolts 65. The shaft 63 is rotatably mounted in the bearing 56 located in the support plate 47 and in the bearing 55 located in the plate 42.

A bell crank 73 is mounted on the shaft 63 and secured to the shaft 63 so as to rotate with the shaft 63 by means of keys and keyways 68.

Slideably fitted with the cylinder 30 is a piston 69. Through the piston 69 is an orifice or bleed opening 71. The orifice 71 is substantially smaller than the conduit 25 so that the fluid medium may escape through conduit 39 faster than it can accumulate in the cylinder assembly 30 through bleed opening 71. A piston rod 72 is connected to the piston 69 and to a bell crank 73 so as to rotate the shaft 63 upon linear movement of the piston 69. Rotatable connection of the piston rod 72 to the piston 69 is achieved by a pin 74 which is secured to the piston 69 and on which the piston rod 72 is rotatably mounted. Similarly a pin 75 is secured to the piston rod 72 and rotatably mounted on the bell crank 73 secured to the shaft 63.

A hydraulic assembly 77 which is best seen in FIGS. 2 and 3 is used to exercise and test the valve and to open the valve for initial operation. A pumping unit 78 (FIG. 3) supplies hydraulic fluid to a hydraulic piston and cylinder unit 80. A hydraulic piston rod 81 is actuated by and is connected to the hydraulic piston and cylinder unit 80. The hydraulic piston rod 81 is connected to a hydraulic piston (not shown) within the hydraulic piston and cylinder unit 80 by means of a threaded coupling 83. The coupling 83 includes a bar 84 which extends at right angles to the hydraulic piston rod 81.

The hydraulic piston and cylinder unit 80 is securely mounted by bolts 86 to a yoke 87 which is secured by bolts 89 to the actuator assembly 12. Mounted on the yoke 87 are switches 91, 92, 93 which are actuated by the bar 84 as the hydraulic piston rod 81 moves linearly back and forth. Stops 95 on the bell crank 73 and housing 26 limit the rotary motion. The switches 91, 92, 93 are connected to a signal board (not shown) to indicate to an operator the position of the valve.

A seal 97, mounted in the actuator assembly 12 prevents leakage from within the actuator assembly 12 to atmosphere. A connection 98 in the actuator assembly 12 is available to drain fluid from around the seal 97. A connector 100 is secured to the end of the hydraulic piston rod 81. The connection 100 has a pin 101 rotatably mounted at its opposite end which pin 100 is rotatably and slideably mounted in a slot 103 in the bell crank 73.

Figure 4:
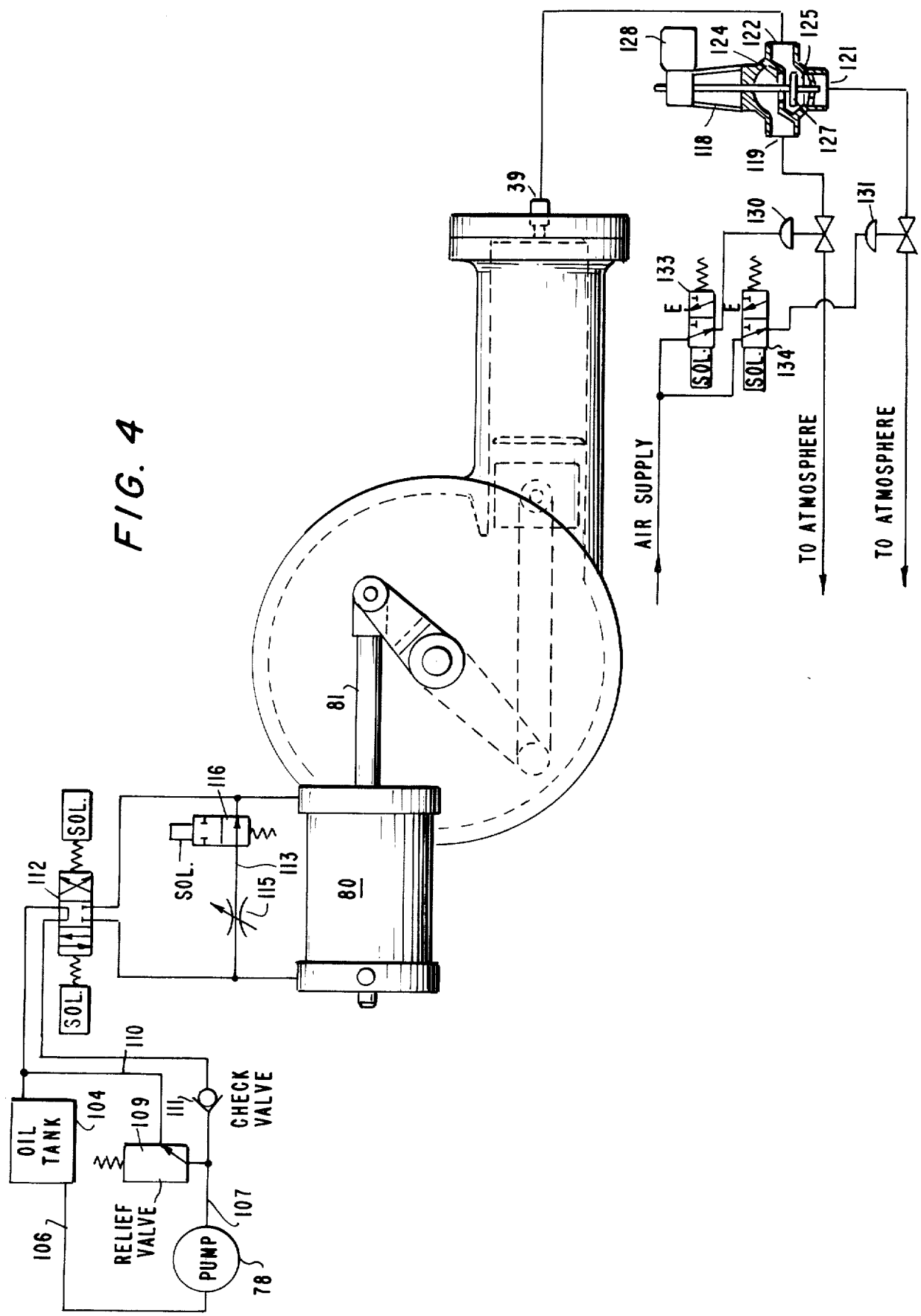
FIG. 4 is a schematic view of the control system for operation of the hydraulic assembly and the actuating assembly.

The interconnection of the various assemblies and their operation as the valve is shown schematically in FIG. 4.

As to the hydraulic assembly 77, a tank 104 provides a reservoir of hydraulic fluid. The pumping unit 78 receives fluid from the tank 104 through an inlet line 106 and discharges the fluid under pressure through a discharge line 107. A relief valve 109 and bypass line 110 permit return of the fluid to the tank 104 should an unexpected fluid pressure buildup occur. Absent an unexpected pressure buildup, the hydraulic fluid will continue along the discharge line 107 through a check valve 111 which avoids any possible back flow through the discharge line 107. The discharge line 107 passes through a solenoid valve 112 which can direct the pressured fluid to either end of the hydraulic piston and cylinder unit 80, thereby moving the hydraulic piston rod 81 in either direction along its linear path which in turn will either open or close the ball valve 23. The solenoid valve 112 may also prevent the flow of fluid to the hydraulic piston and cylinder unit 80. A parallel flow line 113 is also provided across the hydraulic piston and cylinder unit 80 with a constricting valve 115 and a solenoid valve 116. By opening the solenoid valve 116 and properly adjusted the constricting valve 115 the hydraulic piston and cylinder unit 80 operates as a dampening device.

As to the actuator assembly 12, the discharge conduit 39 is connected to a three-way valve 118 having an upper outlet 119 and a lower outlet 121. Flow from the outlet conduit 39 enters the three-way valve 118 through an inlet 122. The three-way valve 118 has an upper valve seat 124 through which flow passes to the upper outlet 119 and a lower valve seat 125 through which flow passes to the lower outlet 121. A plunger 127 may close either the upper seat 124 or the lower seat 125 or neither. In this way flow from the outlet passage 38 is discharged from either the lower outlet 121 or the upper outlet 119 or both. The three-way valve 118 is operated by any suitable mechanism such as a motor 128.

Flow of the fluid medium from the upper outlet 119 passes to an upper air actuated valve 130. Flow of the medium from the lower outlet 121 passes to a lower air actuated valve 131. Both air-actuated valves 130, 131 are closed only if air pressure is maintained. Air is supplied to the upper air actuated valve 130 and the lower air actuated valve 131 from a suitable source (not shown) through solenoid valves 133, 134, respectively. The solenoid valves 133, 134 are energized to retain air pressure to the valves and should the solenoid valves 133, 134 fail the air-actuated valves will open, causing the valves to automatically operate. Either of the air-actuated valves 130, 131 may be individually tested by preventing flow to it by moving the plunger 127 against either the upper valve seat 124 or the lower valve seat 125 so that flow to either valve 130 or valve 131 will be stopped prior to testing.

Upon initial operation of the valve, the fluid medium such as steam will, as it flows from the inlet 15 to the outlet 17, escape through the conduit 25 and fill the enclosure 43. The fluid medium will also enter the cylinder 31 at its inside and adjacent to the enclosure 43. Slowly the fluid medium will equalize pressure in the outside end of the cylinder 31 through the orifice 71. With the discharge port 38 closed the pressure of the fluid medium will then be the same on both sides of the piston 69. During the period of equalization of the pressure, the hydraulic assembly 77 retains the valve ball 23 in the desired position.

Upon opening of the discharge port 38 which occurs upon eliminating the air supply to the solenoid valves 130, 131, the piston 69 will move toward the discharge port 38 thereby rotating the valve.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:
1. A valve including:
   a housing means having a flow passage for a fluid medium under pressure with an inlet and an outlet, said housing further having a cylinder therein, said cylinder having an inside end and an outside end, said outside end having a discharge port therein;
   a piston slideably mounted within said cylinder, said piston having an orifice through it;
   stop means located in said flow passage for opening and closing said flow passage, said stop means having an opening through it, said stop means and said housing means having a conduit means connecting said opening in said stop means with the inside end of said cylinder;
   actuating means mounted in said housing means and connected to said stop means and piston for actuating said stop means when the piston is moved toward the outside end of said cylinder;
   means for opening and closing said discharge port whereby the pressure of the fluid medium moves the piston when the pressure in the outside end of the cylinder is released through the discharge port.
2. A valve including;
   a tubular body means with an inlet and outlet arranged substantially in alignment with each other;
   an enclosure extending from said tubular body between said inlet and outlet;

a cylinder assembly having a cylinder therein extending from said enclosure, said cylinder being aligned in a parallel plane with said inlet and outlet, said cylinder communicating with said enclosure at one end and having a discharge port at the opposite end;

a stop means rotatably mounted within said tubular body means between said inlet and outlet for opening and closing said tubular body means, said stop means having an opening through it and a conduit from said opening communicating with said enclosure when said stop means is in a position to be actuated;

a shaft rotatably mounted in said enclosure and connected at one end to said stop means so as to rotate with said stop means;

a piston slideably mounted within said cylinder, said piston having an orifice through it;

a bell crank mounted on said shaft;

a piston rod connected to said piston and bell crank to rotate said shaft when said piston moves; and means for opening and closing said discharge port whereby the pressure of the fluid medium moves the piston when the pressure in the outside end of the cylinder is released through the discharge port.

3. A valve according to claim 2 further including a means for positioning the piston during initial operation until the pressure on the piston is equalized through the orifice.

4. A valve according to claim 3 wherein the means for positioning the piston includes a hydraulic piston and cylinder assembly including a hydraulic piston rod connected to said bell crank.

5. A valve according to claim 2 wherein the stop means is a ball valve.

6. A valve including:

a tubular body means with an inlet and outlet arranged substantially in alignment with each other;

an enclosure extending from said tubular body between said inlet and outlet;

a cylinder assembly having a cylinder therein extending from said enclosure, said cylinder being aligned in a parallel plane with said inlet and outlet, said cylinder communicating with said enclosure at one end and having a discharge port at the opposite end;

a ball valve rotatably mounted within said tubular means between said inlet and outlet for opening and closing said tubular body means, said ball valve having an opening through it and a conduit from said opening communicating with said enclosure;

a shaft rotatably mounted in said enclosure and connected at one end to said ball valve so as to rotate with said ball valve;

a piston slideably mounted within said cylinder, said piston having an orifice through it;

a bell crank mounted on said shaft;

a piston rod connected to said piston and bell crank to rotate said shaft when said piston moves;

means for opening and closing said discharge port whereby the pressure of the fluid medium moves the piston when the pressure in the outside end of the cylinder is released through the discharge port;

a hydraulic unit having a hydraulic cylinder therein mounted in said enclosure in substantially the same plane as said cylinder assembly and at an angle with said cylinder assembly;

a hydraulic piston slideably mounted within said hydraulic cylinder;

a hydraulic piston rod connected to said hydraulic piston and to said bell crank; and means for supplying hydraulic fluid to the hydraulic cylinder to actuate the ball valve and means partially coextensive therewith including a constricting valve to pass hydraulic fluid from one end of the hydraulic cylinder to the other end to dampen the movement of the ball valve when actuated by the piston.

7. A valve according to claim 6 wherein the flow path through said orifice is substantially smaller than the flow path through said conduit and enclosure.

8. A valve according to claim 7 wherein said means for opening and closing said discharge port includes a three-way valve with two outlets, each connected to an air-actuated solenoid valve.

9. A valve comprising:

a body means having a flow passage through it for the flow of a fluid medium;

a stopper means within said body means for opening and closing said flow passage;

a piston and cylinder assembly having a piston slidably mounted within a cylinder, one end of said cylinder having a discharge port herein;

a conduit means from said flow passage to the opposite end of said cylinder from said discharge port whereby the pressure of the fluid medium is applied against said piston, said piston having an orifice through it, allowing the fluid medium to escape slowly to the opposite side of the piston;

means for opening and closing the discharge port whereby the pressure on both sides of the piston will equalize with the discharge port closed and whereby the pressure on the one side of the piston will be released upon opening of the discharge port, causing the piston to move toward said discharge port;

actuating means connected to the piston and the stopper means for actuating the stopper means upon movement of the piston; and another cylinder and piston assembly, said other cylinder and piston assembly being hydraulically powered for positioning said previously defined piston during initial operation until the pressure on said previously defined piston is equalized through said orifice.

* * * * *